7359X
A. Hathaway.
Ruling Mach.
No 4
Patented Dec. 31. 1832.
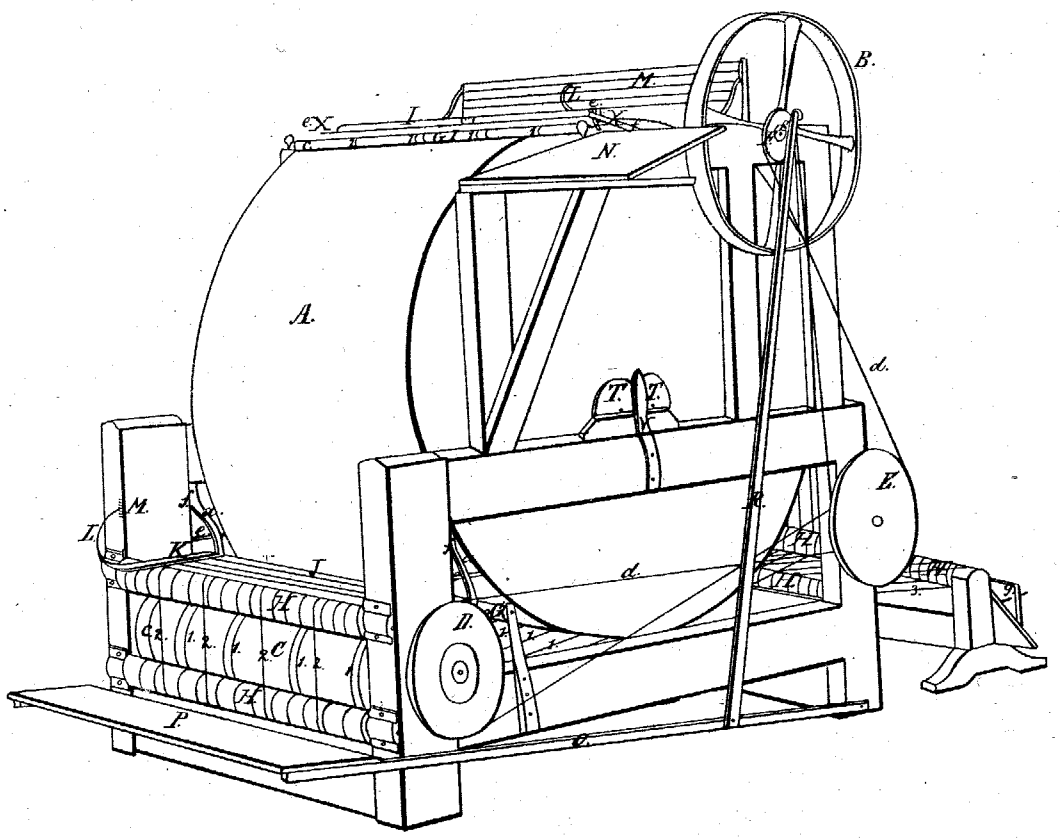

7354X    Dec. 31. 1832    [illegible]

Alfred Hathaway. of Troy Massachusetts

Letters Patent.

The Schedule referred to in these Letters Patent and making
part of the same, containing a description in the words of the said
Alfred Hathaway himself of his improvement in the machine for
ruling paper.

To all whom it may concern.

Know ye that I Alfred Hathaway of Troy in the state of Massachusetts
have invented, constructed, & applied to use a new & useful improve=
ment in the machinery for ruling paper which I have named,
"Hathaways Improved ruling machine" by which both sides of the
paper are ruled at one operation said machine is specified and
described as following. (reference being had to the annexed
drawing as part of this specification) Fig 1. A. is a cylinder
say 36 inches in diameter with a flange or guide, half an inch
high on either end as may suit the operators this flange or guide
serves as a guide to lay the paper on - the whole made of cast iron
& turned true; the cylinder is covered with a woolen cloth &
runs on friction rollers T.T: a cylinder of larger size would
probably be more convenient. B is a balance wheel, of size
& weight sufficient to keep up the motion of cylinder A. & is
attached to a shaft which runs accross the top of the frame;
with a crank on both ends (two balance wheels i.e. one on each
end of the shaft would probably be a further improvement)
C. (in Fig 1) is another cylinder (which should also be of cast iron
if the machine is to be used for ruling on both sides at once, if on
one side only wood will answer) [illegible] sufficiently deep to
receive the cords which bind the paper to cylinder A. & carry
the same from cylinder A. to cylinder C. to be covered also
with a woolen cloth, & neatly filed in the [illegible], so as to bring
the 7359x the cords & surface of the cylinder on a level — there should be
6 or 8 scores on this cylinder, & so arranged as to bind & convey
the different sizes of paper, with as many cords as scores, which
scores should match with those on rollers H.I. & G.I. (in fig 8)
The size of the cylinder, if from 8 to 10 inches, will be sufficient-
ly large for the paper to turn on; & as the points of the pins strike on
the top of the cylinder, the size does not materially affect the
ruling. — D (see fig 1) are pulleys on the end of the shaft of cylinder
C. which run loose on the shaft with a dog in the pulley & back
wheel on the shaft to prevent the machine from starting the wrong
way. — E (fig 1) pulleys to increase the motion of the balance wheel
by which the motion of the cylinder is regulated, the outside
pulley to run with pulley F. the inner pulleys are smaller to run
with pulleys D. pulleys E are all connected & run on a stud attach-
ed to the frame. F (fig [illegible] is a pulley on the end of the balance wheel
shaft & runs with the large pulley E. — G.I. (fig 8) is a small iron rol-
ler on which the cords turn and is about 1½ inch in diameter
scored as near together as possible, for the purpose of accommo-
dating the cords when moved to clear the pins, this roller hangs
about ½ of an inch from cylinder C. — G (fig 8) is a small iron
roller about the size of roller G.I. & scored like that, to bring the
cords over cylinder C. on the surface, between the scores in cylin-
der C. — H (fig 8) wooden rollers to keep the cords from the cylinder
on their return motion and to carry the paper to the hopper E.
I (fig 8) is a frame in which the pens are set for ruling; it consists
of two bars of brass from half to three quarters of an inch square
with a groove in the front of each bar, with [illegible] to keep the bars
permanent; the groove in the back bar receives a lip on the back of the [illegible]
cistern for the ink; the groove in the front bar receives a hook on a clasp
the other end of which hooks into the front of the cistern for ink; & by means
of a thumb screw thro' the clasp, bearing against the bar opposite the [illegible]
which hooks into the front of the front bar, the cistern is held fast;
if more than one bar or cistern is used at the same time, the clasp [illegible]

be

7359X be without (i.e. outside of) the hooks which hook in the groove in
the front bar, the better to raise or drop the fronts of the cisterns in
order to bring the points of the pens in the different cisterns to bear
with equal pressure on the paper when ruling. The boxes or cisterns
to contain the ink, are made of brass or copper, about half an inch
deep, & one & one half inch wide, (the length in proportion to the
number of pens, & the manner of their arrangement) with a lip on
the top of the back of the cistern to fit in the groove in the back bar
of the pen frame & a groove in the front of the cistern to receive the
hook on the clasp with tubes thro' the front of the cistern, extending
out from the cistern about half an inch on a straight line with
the bottom of cistern; the tubes are flat & stand edgewise & about
three sixteenths of an inch deep, & open at the top for the purpose
of cleansing them, they are made of brass. The pens are flat tubes
open at the top, standing edgewise, and are sufficiently wide to fill
the ends of the tubes & are [illegible] are soldered into them inclining down-
wards so as to bring the points to bear on the top of the cylinders [illegible]
while the cisterns hang a sufficient distance above the cylinders to give
the cords a free operation under them. J the same as I. — K (figs. [illegible] is a
lever attached to the frame I, to give the pressure on the points of the
pens & is made fast at one end, having a spring at the other
L is a spring attached to the end of lever K. M is a rack to catch the
spring L in, in order to get the pressure on the points of the pens.
N (fig 1&2) is a table for the paper. O (fig 1&2) treadles which hang at the
back posts of the frame. P (fig 1&2) the foot board which is made
fast to the ends of the treadles, & by means of which the machine
is worked. R. (fig 1&2) the pitman or sweep which runs from about
the middle of the treadle to the crank. S. the crank made to vary to
accommodate the motion of the foot. — T T, friction rollers. V. iron or brass
studs made fast to the sides of the frame and bearing lightly against the
ends of the shaft of the cylinder in its place. — W. a small iron roller
about half the size of the iron roller [illegible], covered to match with it to
keep the cords as near the cylinder as possible & not touch it in order
to

7359X to give the pens a free operation. X. is a pen frame supported which is hung at P. and varied by screw e to alter the position of the cistern as necessity may require.— a (fig 1) is for the same purpose with X. but of a different form. f is the box or hinge to at X. & is made fast to the frame by a set screw with a slot in the box to admit of moving to accomodate the position of the pens. b (fig 2) is a guide on the side of the frame in which one of the treadles operates to keep the foot motion steady. C (fig 3) is a round belt or band (running in order with the cords round cylinder A and round cylinder C. on the surface) sufficiently strained to give cylinder A. the same motion with cylinder C.. d round belts or bands by means of which the foot motion is connected with & communicated to the Machine.... e (fig 1) is a screw by which the position of the pens is regulated. S (fig 1) is the hopper which receives the paper after it is ruled. Figures 1. are a set of cords running from the small iron roller G.I. to cylinder C. to bind the paper to cylinder A. & carry it to cylinder C.. Figures 2 are a set of cords to bind the paper to cylinder C. & carry to roller H on the back of the frame. — Figures 3 are a set of cords which carry the paper from roller H to the hopper S. The specific im= provement which I claim as my invention in the afore= going specification, are. 1st Ruling both sides of paper at one operation, or one side only.... 2nd The application of the motion to the Machine, & the general arrangement of the Machine, & the operating of it by one person.. 3rd The peculiar construction of the pens.
4th The application of the pens to the top of the cylinder.

In testimony of which I the said Alfred Hathaway have hereunto set my name at providence in the State of Rhode Island this twelfth day of Sept. A.D. 1830.

Regd. Witnesses
[illegible] Wm. J. Patten }
Allen C Peck }

Alfred Hathaway

[illegible]